US008944526B2

(12) United States Patent
Nishioka et al.

(10) Patent No.: US 8,944,526 B2
(45) Date of Patent: Feb. 3, 2015

(54) VEHICLE BRAKE SYSTEM

(75) Inventors: Takashi Nishioka, Utsunomiya (JP);
Satoshi Matsushita, Utsunomiya (JP);
Hidetoshi Kobori, Utsunomiya (JP);
Kunimichi Hatano, Utsunomiya (JP);
Naoto Ohkubo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 13/995,224

(22) PCT Filed: Dec. 15, 2011

(86) PCT No.: PCT/JP2011/007017
§ 371 (c)(1),
(2), (4) Date: Jun. 18, 2013

(87) PCT Pub. No.: WO2012/086162
PCT Pub. Date: Jun. 28, 2012

(65) Prior Publication Data
US 2013/0270895 A1 Oct. 17, 2013

(30) Foreign Application Priority Data

Dec. 23, 2010 (JP) .................................. 2010-286828

(51) Int. Cl.
*B60T 13/16* (2006.01)
*B60T 7/04* (2006.01)
*B60T 13/66* (2006.01)
*B60T 13/68* (2006.01)

(52) U.S. Cl.
CPC .............. *B60T 13/161* (2013.01); *B60T 7/042* (2013.01); *B60T 13/662* (2013.01); *B60T 13/686* (2013.01); *B60T 2220/04* (2013.01)
USPC .......................................................... 303/14

(58) Field of Classification Search
USPC .................... 303/3, 11, 15, 14, 151–152, 155
See application file for complete search history.

(56) References Cited

U.S. PATENT DOCUMENTS

| 8,579,386 | B2 * | 11/2013 | Hatano | ..................... 303/116.2 |
| 8,583,337 | B2 * | 11/2013 | Matsushita | .................... 701/70 |
| 2008/0179941 | A1 * | 7/2008 | Matsushita | .................... 303/20 |

FOREIGN PATENT DOCUMENTS

| EP | 2 353 950 A1 | 8/2011 |
| JP | 5-201328 A | 8/1993 |

(Continued)

OTHER PUBLICATIONS

German Office Action issued on Aug. 6, 2014 in the corresponding DE Patent Application 11 2011 104507.7 and the English translation thereof.

*Primary Examiner* — Anna Momper
(74) *Attorney, Agent, or Firm* — Carrier Blackman & Associates, P.C.; Joseph P. Carrier; William D. Blackman (57) ABSTRACT

Upon occurrence of a change in the load versus fluid loss property, the braking force for the given brake pedal operation amount is changed so that the vehicle operator is enabled to perceive the change in the load versus fluid loss property. In a vehicle brake system comprising a motor actuated cylinder, wheel cylinders, a stroke sensor for detecting a brake pedal operation amount, a target value setting circuit for setting a target stoke of the motor actuated cylinder, and a fluid pressure compensating circuit for correcting the target stoke upon detection of a deviation between a brake fluid pressure reference value corresponding to the brake pedal operation amount and an actual brake fluid pressure in a direction to reduce the deviation, a stroke limiting circuit restricts a compensation value produced by the fluid pressure compensation circuit according to the brake pedal operation amount.

2 Claims, 7 Drawing Sheets

(56) References Cited

FOREIGN PATENT DOCUMENTS

| | | |
|---|---|---|
| JP | 2003-335234 A | 11/2003 |
| JP | 2007-245870 A | 9/2007 |
| JP | 2009-137377 A | 6/2009 |
| JP | 2009-227023 A | 10/2009 |

* cited by examiner

VEHICLE BRAKE SYSTEM

TECHNICAL FIELD

The present invention relates to a brake-by-wire type vehicle brake system which can control the braking force independently from the operation performed by the vehicle occupant.

BACKGROUND OF THE INVENTION

According to a known brake system (see Patent Document 1, for instance), both a normal braking based on a frictional brake action and a regenerative braking using a motor generator can be performed under an electronic control without requiring the intervention of the vehicle operator, and ABS (Antilock Brake System) and VSA (Vehicle Stability Assist) control features are also incorporated in the system. This vehicle brake system employs a motor actuated tandem cylinder, incorporated with a pedal simulator providing a required pedal reaction, which may also be combined with an ABS hydraulic unit and/or a VSA hydraulic unit.

The control unit of the brake system sets a target brake fluid pressure as a reference value of the brake fluid pressure according to a brake pedal stroke, sets a target stroke for the motor actuated cylinder according to a fluid pressure versus cylinder stroke map accounting for the relationship between the fluid pressure and the load (load versus fluid loss property), converts the target stroke into a target motor angle, performs a feedback control on the motor angle so that the motor actuated cylinder may be actuated by the target stroke. Thereby, the fluid pressure commanded by the vehicle operator is produced in the wheel cylinders.

To ensure a favorable tracking behavior of the actual brake fluid pressure to the target brake fluid pressure when the load versus fluid loss property has changed, the control unit of the brake system performs a target brake fluid pressure correction by adding the deviation between the reference brake fluid pressure and the detected actual brake fluid pressure to the target brake fluid pressure to obtain a corrected target brake fluid pressure.

A brake pedal operation amount versus fluid pressure reference map that is used for computing a target brake fluid pressure from the brake pedal operation amount in this proposed system is based on the pedal force versus braking force property of a conventional vehicle where the fluid pressure generated by the master cylinder with a power assist using intake vacuum is directly applied to the wheel cylinders so that the same braking feel or impression as that of the conventional brake system may be achieved. In combination with such a target property, the use is made of a brake pedal operation amount versus pedal force property which is realized by using a pedal simulator, and a brake fluid pressure versus braking force property that can be determined from the vehicle property.

PRIOR ART DOCUMENT(S)

Patent Document(s)

Patent Document 1: JP2009-227023A

SUMMARY OF THE INVENTION

Task to be Achieved by the Invention

In a conventional vehicle where the fluid pressure of the master cylinder is directly applied to the wheel cylinders, when the load versus fluid loss property has changed, the vehicle operator is enabled to perceive such a change from the corresponding change in the brake pedal operation amount versus deceleration property, and is therefore enabled to appropriately evaluate the change in the load versus fluid loss property.

However, according to the prior brake-by-wire control, even when some change occurs in the load versus fluid loss property, the function of the system to correct the operation amount of the motor actuated cylinder ensures that an actual brake fluid pressure exactly corresponding to the brake pedal operation amount is produced so that no change occurs in the brake pedal operation amount versus deceleration property as result. Therefore, the vehicle operator is unable to perceive any change in the load versus fluid loss property from the braking force or the deceleration of the vehicle for a given pedal force, and is unable to identify any abnormal condition of the brake system until the load versus fluid loss property has worsened enough to reach a failure detecting region, and a warning is issued or a certain countermeasure is switched on by the system as a result. Because the normal control process is inevitably terminated when the load versus fluid loss property has reached the failure detecting region, the property change resulting from the detection of a failure by the system may cause a significant change in the response of the vehicle which may possibly cause an unfamiliar or unpleasant impression to the vehicle operator.

In view of such problems of the prior art, a primary object of the present invention is to enable the vehicle operator to perceive an occurrence of a change in the load versus fluid loss property by changing the magnitude of the braking force that is produced for the given brake pedal operation amount upon occurrence of a change in the load versus fluid loss property.

Means to Accomplish the Task

To achieve such an object, the present invention provides a vehicle brake system, comprising: a fluid pressure generating means (motor actuated cylinder 13) (also referred to as a fluid pressure generating unit 13 power actuated according to a given target operation amount (St) to generate a brake fluid pressure corresponding to the operation amount; a friction braking means (2a, 2b, 3a, 4a) (also referred to as a friction braking unit 2a, 2b, 3a, 4a)configured to be actuated by the brake fluid pressure generated by the fluid pressure generating means; an actual brake fluid pressure detecting means (25b) (also referred to as an actual brake fluid pressure detecting unit 25b) for detecting an actual brake fluid pressure (B) supplied to the friction braking means; a brake pedal operation amount detecting means (11a) (also referred to as a brake pedal operation amount detecting unit 11a) for detecting a brake pedal operation amount (Ps) caused by a vehicle operator; a target operation amount setting means (31, 33) (also referred to as a target operation amount setting unit 31, 33) for setting the target operation amount according to the detected brake pedal operation amount; and a correcting means (37, 38, 32) (also referred to as a correcting unit 37, 38, 32) for correcting the target operation amount (St) so as to reduce a deviation of a brake fluid pressure (B0) corresponding to the target operation amount (St) from the actual brake fluid pressure (B); and a correction restricting means (51, 56, 59) (also referred to as a correction restricting unit 51, 56, 59) for restricting an amount (ΔB) by which the target operation amount is corrected by the correcting means according to the brake pedal operation amount (Ps).

According to this arrangement, when the actual operation amount of the fluid pressure generating means and the actual brake fluid pressure are not within a prescribed fault determining region, the correction restricting means restricts the correction amount produced from the correcting means so that the produced actual brake fluid pressure may deviate from the reference value corresponding to the actual operation amount. In other words, the produced braking force differs from the braking force that is predetermined in dependence on the brake pedal operation amount. Therefore, although the correction of the target operation amount is performed according to the deviation between the brake fluid pressure corresponding to the target operation amount, the vehicle operator is enabled to perceive the change in the load versus fluid loss property by means of the change in the braking force for the given brake pedal force.

In particular, by restricting the correction amount according to the brake pedal operation amount, the vehicle operator is enabled to perceive the change in the braking force while maintaining the impression of the change in the braking force within a favorable range and not creating any unfamiliar impression. Therefore, the vehicle operator is enabled to perceive the change in the load versus fluid loss property similarly as in a conventional vehicle without causing any discomfort to the vehicle operator.

According to a certain aspect of the present invention, when the corrected target operation amount exceeds a limit value defined in dependence on the brake pedal operation amount, the target operation amount is set at the limit value.

According to this arrangement, a limit value is imposed for at least one of the upper limit value and the lower limit value on the correction amount provided by the correcting means, and upon occurrence of a change in the load versus fluid loss property that will require a correction amount exceeding the lower or upper limit value, a brake fluid pressure different from that corresponding to the brake pedal operation amount is applied. Therefore, the change in the braking force can be perceived by the vehicle operator.

According to another aspect of the present invention, the vehicle brake system further comprises a master cylinder (15) configured to be actuated by a brake pedal (11); and a fail-safe means (54) (also referred to as a fail-safe unit 54) for stopping an operation of the fluid pressure generating means and driving the friction braking means with a brake fluid pressure produced by the master cylinder when the correction amount of the correcting means is restricted by the correction restricting means and the actual brake fluid pressure has exceeded a prescribed abnormality determination value.

According to this arrangement, an undesired situation such as exasperating the leakage of brake fluid in case a crack is produced in the brake fluid piping by excessively driving the motor drive cylinder 13 can be avoided.

Effect of the Invention

Upon occurrence of a change in the load versus fluid loss property, the braking force for the given brake pedal operation amount is changed so that the vehicle operator is enabled to perceive the change in the load versus fluid loss property.

DETAILED DESCRIPTION OF THE PREFERRED EMBODIMENT(S)

Figure 1:
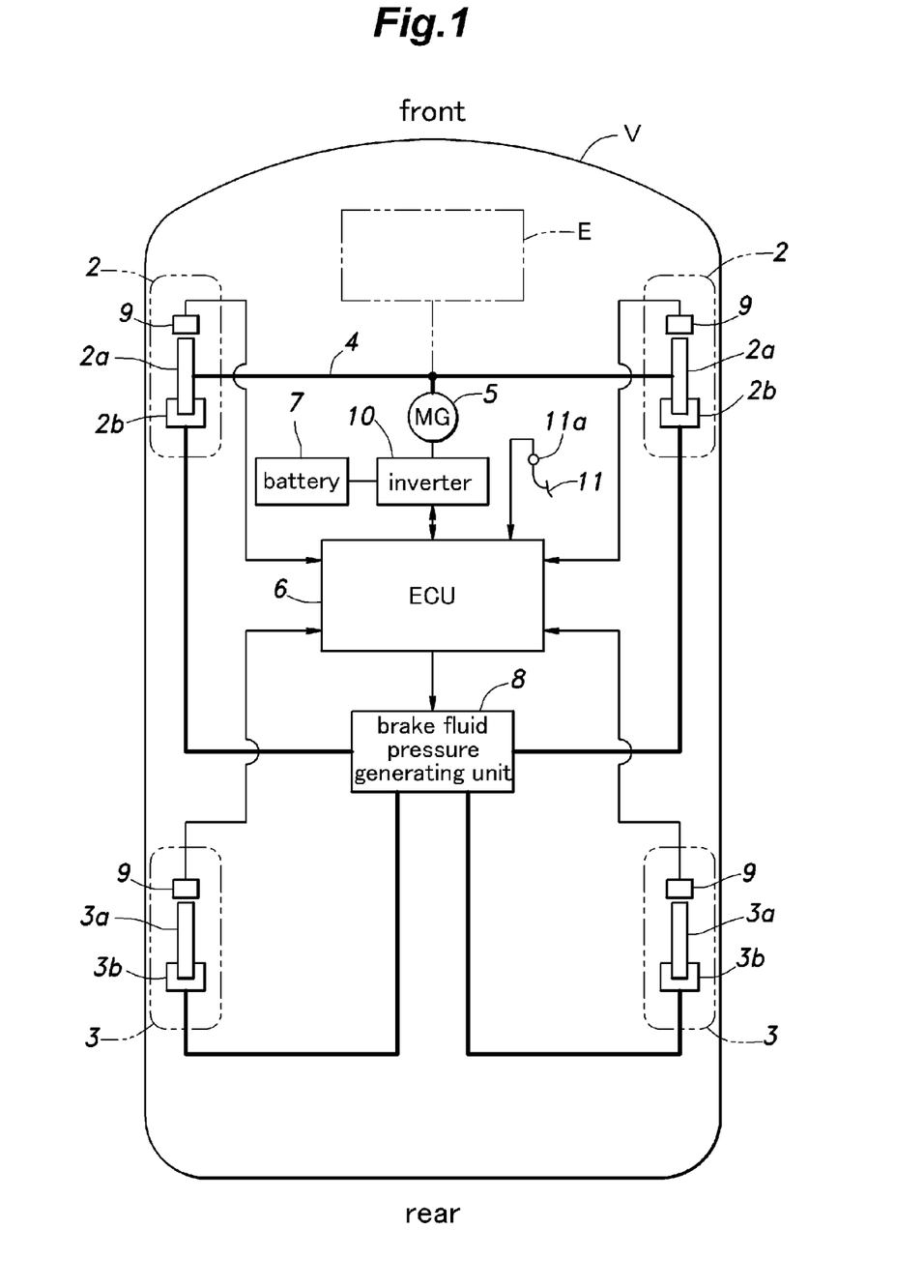
FIG. 1 is a schematic diagram showing the overall system of a vehicle brake system embodying the present invention.

Now the present invention is described in the following in more detail in terms of a concrete embodiment with reference to the appended drawings. FIG. 1 is a system diagram of an essential part of a brake system of an electric or hybrid vehicle embodying the present invention.

This vehicle V shown in FIG. 1 comprises a pair of front wheels 2 located on the front side thereof and a pair of rear wheels 3 located on the rear side thereof. The front wheels 2 are connected to front axles 4 which are in turn mechanically connected to a motor/generator 5 via a differential gear device (not shown in the drawing).

The motor/generator 5 operates both as an electric motor for propelling the vehicle and a generator for providing a regenerative braking. More specifically, the motor/generator 5 can receive electric power from a rechargeable battery 7 serving as a power source via an inverter 10, and can also supply electric power to (recharge) the battery 7 by converting the kinetic energy into electric power by the regenerative braking when decelerating the vehicle.

The vehicle V is provided with a control unit 6 that includes a control circuit incorporated with CPU to perform various control actions for the vehicle V including the distribution of braking force. The control unit 6 is electrically connected to the inverter 10. In the case of an electric vehicle, the structure illustrated in FIG. 1 may be applied as it is, or, alternatively, an additional motor/generator for the rear wheels 3 may be included in the vehicle 1. In the case of a hybrid vehicle, the front axles 4 are additionally connected to the output shaft of an internal combustion engine E indicated by the double-dot chain dot lines in FIG. 1. The illustrated engine E is configured to drive the front wheels, but may also be configured to drive all of the four wheels.

Each of the front and rear wheels 2, 3 is provided with a per se known disk brake including a disk 2a, 3a integrally attached to the wheel 2, 3 and a caliper incorporated with a wheel cylinder 2b, 3b. The wheel cylinder 2b, 3b is connected to a brake fluid pressure generating unit 8 via a per se known brake tubing. The brake fluid pressure generating unit 8 consists of a hydraulic circuit configured to distribute hydraulic brake fluid pressure to the different wheels and adjust the hydraulic brake fluid pressure level for each wheel.

A wheel speed sensor 9 is provided in association with each wheel 2, 3, and a displacement sensor 11a is provided in association with a brake pedal 11 (that is operated by a vehicle operator) to detect a brake operation amount or a brake depression stroke. The detection signals of the wheel speed sensors 9 and the displacement sensor 11a are forwarded to the control unit 6.

Upon detecting an output signal of the displacement sensor 11a of the brake pedal 11 becoming greater than zero as a command for a braking action, the control unit 6 performs a control action for braking. In the illustrated embodiment, the braking action is performed as that of a brake-by-wire system in order to perform a regenerative cooperative control combining a regenerative braking and a hydraulic braking.

The brake system 1 of this vehicle V is described in the following with reference to FIG. 2. The brake system 1 consists of a brake-by-wire system that detects the brake operation amount (brake pedal stroke) of the brake pedal 11 by using the stroke sensor 11a (serving as an input amount sensor) and produces a brake fluid pressure according to the detected brake operation amount by using a motor actuated cylinder 13 (serving as a brake fluid pressure generating cylinder) configured to be actuated by an electric servo motor 12, independently from the operation performed by a vehicle operator, instead of being mechanically coupled to the brake fluid pressure generating cylinder for producing the required brake fluid pressure.

Figure 2:
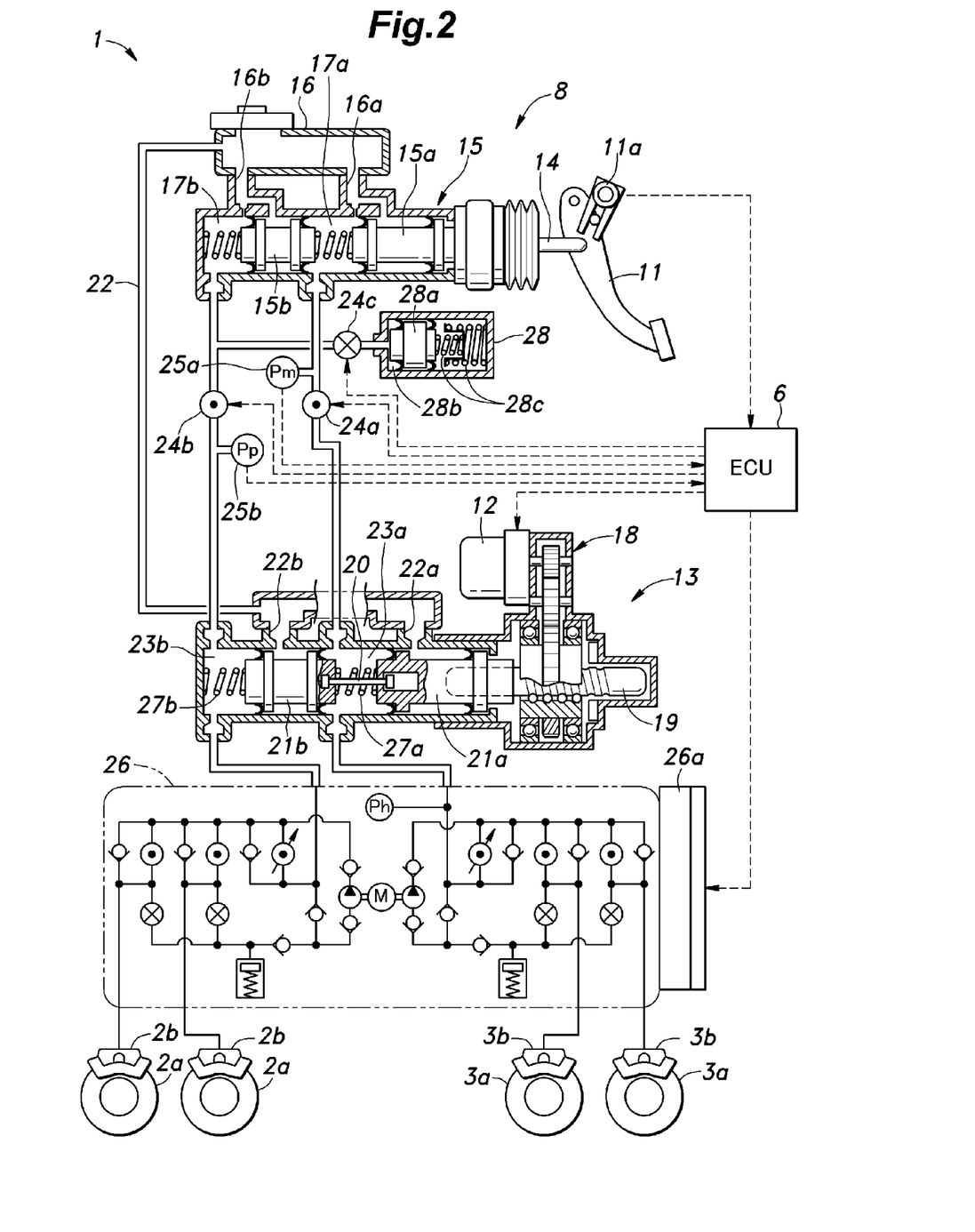
FIG. 2 is a schematic hydraulic circuit diagram of the vehicle brake system according to the present invention.

As shown in FIG. 2, the brake pedal 11 is pivotally supported by the vehicle body, and an end of a rod 14 is connected to the brake pedal 11 so as to convert the angular movement of the brake pedal 11 into a substantially linear motion of the rod 14. The other end of the rod 14 engages a first piston 15a of a master cylinder 15 of a tandem type in the direction to force the piston 15a into the master cylinder 15. The master cylinder 15 additionally receives therein a second piston 15b on the side of the first piston 15a facing away from the rod 14, and the first and second pistons 15a and 15b are both resiliently urged toward the rod 14 by respective springs. The brake pedal 11 is also urged by a spring (not shown in the drawing) such that the brake pedal 11 is held at the initial position shown in FIG. 2 by a stopper not shown in the drawing when the brake is not being operated.

The master cylinder 15 is provided with a reservoir tank 16 for receiving and feeding the brake fluid depending on the displacement of the two pistons 15a and 15b so as to compensate for any deficiency in the brake fluid. The pistons 15a and 15b are each fitted with per se known seal members to shut oil passages 16a and 16b communicating the interior of the master cylinder 15 with the reservoir tank 16, respectively. Inside the master cylinder 15, a first fluid chamber 17a is defined between the first and second pistons 15a and 15, and a second fluid chamber 17b is defined on the side of the second piston 15b facing away from the first piston 15a.

In addition to the electric servo motor 12, the motor actuated cylinder 13 is provided with a gear mechanism 18 connected to the electric servo motor 12, a screw rod 19 which is connected to the gear mechanism 18 via a ball screw mechanism for an axial movement, and a first piston 21a and a second piston 21b which are connected to the screw rod 19 coaxially and in tandem.

The second piston 21b is fixedly provided with a connecting member 20 projecting toward the first piston 21a, and the other end of the connecting member 20 is connected to the first piston 21a so as to allow a relative axial movement with the first piston 21a to a certain extent. In particular, the first piston 21a is enabled to advance (toward the second piston 21b) independently from the second piston 21b, but when fully retracted back to the initial position shown in FIG. 2, the first piston 21a is enabled to pull back the second piston 21b to the initial position via the connecting member 20. Further, the first and second pistons 21a and 21b are both resiliently urged toward the screw rod 19 by respective springs 27a and 27b.

The motor actuated cylinder 13 is provided with oil passages 22a and 22b which in turn communicate with the reservoir tank 16 via a communication passage 22, and the pistons 21a and 21b are fitted with per se known seal members to shut the oil passages 22a and 22b as required. In the motor actuated cylinder 13, a first fluid pressure generating chamber 23a is defined between the first and second pistons 21a and 21b, and a second fluid pressure generating chamber 23b is defined on the side of the second piston 21b facing away from the first piston 21a.

The first fluid chamber 17a of the master cylinder 15 is communicated with the first fluid pressure generating chamber 23a of the motor actuated cylinder 13 via a normally open solenoid valve 24a, and the second fluid chamber 17b of the master cylinder 15 is communicated with the second fluid pressure generating chamber 23b of the motor actuated cylinder 13 via a normally open solenoid valve 24b by using appropriate tubing. A master cylinder side brake fluid pressure sensor 25a is provided on the line between the first fluid chamber 17a and the solenoid valve 24a, and a motor actuated cylinder side brake fluid pressure sensor 25b is provided on the line between the solenoid valve 24b and the second fluid pressure generating chamber 23b.

A cylinder type simulator 28 is provided on the line between the second fluid chamber 17b and the solenoid valve 24b via a normally closed solenoid valve 24c. The simulator 28 is provided with a cylinder having an interior separated by a piston 28a. A fluid receiving chamber 28b is defined on the side of the piston 28a facing the solenoid valve 24b, and a compression coil spring 28c is interposed between the opposite side of the piston 28a and the opposing axial end of the cylinder of the simulator 28. When the brake pedal 11 is depressed to cause the brake fluid in the second fluid chamber 17b to flow into the fluid receiving chamber 18b while the solenoid valves 24a and 24b are closed and the solenoid valve 24c is open, the biasing force of the compression coil spring 28c is transmitted to the brake pedal 11 so that the vehicle operator is caused to experience a brake pedal reaction from the brake pedal 11 in a similar manner as in the case with the conventional brake system in which the master cylinder and the wheel cylinder are directly connected to each other.

The first fluid pressure generating chamber 23a and second fluid pressure generating chamber 23b of the motor actuated cylinder 13 are communicated with a plurality (four, in the illustrated embodiment) of wheel cylinders 2b, 3b via a VSA system 26 which may consist of a per se known vehicle behavior stabilization control system combining an ABS for preventing the locking of wheels at the time of braking, a TCS (traction control system) for preventing the slipping of wheels at the time of acceleration, a yaw moment control at the time of cornering, a brake assist function, an automatic brake function for collision prevention and lane keeping, etc.

As such a VSA system is per se known, detailed description thereof is omitted in this disclosure. The VSA system 26 includes brake actuators including various hydraulic devices responsible for the control of a first system for the wheel cylinders 2b of the front wheels and a second system for the wheel cylinders 3b of the rear wheels, and a VSA control unit 26a for controlling the various hydraulic devices.

The overall control of the brake fluid pressure generating unit 8 is performed by the control unit 6. The control unit 6 receives the various detection signals from the stroke sensor 11a, the brake fluid pressure sensors 25a and 25b and other sensors (not shown in the drawings) for detecting the behavior of the vehicle.

Based on the detection signal from the stroke sensor 11a, and the operating condition of the vehicle that can be determined from the detection signals of the various sensors, the control unit 6 controls the brake fluid pressure generated by the motor actuated cylinder 13. In the case of a hybrid vehicle (or electric vehicle) as is the case with the illustrated embodiment, as the motor/generator provides a regenerative braking, the control unit 6 is configured to control the braking force allocation or control the brake fluid pressure produced by the motor actuated cylinder 13 depending on the extent or magnitude of the regenerative braking.

The mode of control operation during a normal braking is described in the following. FIG. 2 shows the state of the system when the brake pedal 11 is not being operated. The detection value of the stroke sensor 11a is at an initial value (=0), and the control unit 6 does not produce any brake fluid pressure generation signal. At this time, the screw rod 19 of the motor actuated cylinder 13 is in the most retracted position and the two pistons 21a and 21b of the motor actuated cylinder 13 are also in the respective most retracted positions under the spring force of the return springs 27a and 27b so that no brake fluid pressure is produced in either of the fluid pressure generating chambers 23a and 23b.

When the brake pedal 11 is depressed to a certain extent, and the detection value of the stroke sensor 11a has become greater than zero, a brake-by-wire control is performed in such a manner that the two solenoid valves 24a and 24b are closed to prevent the fluid pressure generated by the master cylinder 15 to be transmitted to the motor actuated cylinder 13 and the solenoid 24c is opened to cause the fluid pressure generated by the master cylinder 15 to be transmitted to the simulator 28. Based on the input amount detection value (brake operation amount Ps) detected by the stroke sensor 11a, the control unit 6 determines a target fluid pressure Bt that takes into account the regenerative braking, and forwards a corresponding motor drive command value (operation amount) to the electric servo motor 12. This in turn causes the screw rod 19 and hence the first piston 21a to be pushed out according to this command value, and a brake fluid pressure corresponding to the input or the depression stroke (brake operation amount Ps) of the brake pedal 11 is generated in the first fluid pressure generating chamber 23a. At the same time, the second piston 21b is displaced forward under the pressure in the first fluid pressure generating chamber 23a against the biasing force of the return spring 27b, and the corresponding brake fluid pressure is generated in the second fluid pressure generating chamber 23b.

When the vehicle operator has displaced the brake pedal 11 in the returning direction (or has released the brake pedal), according to the returning stroke of the brake pedal detected by the stroke sensor 11a, the electric servo motor 12 returns the screw rod 19 and hence the first piston 21a towards the initial position such that the brake fluid pressure is diminished by an amount corresponding to the returning stroke or the current depression of the brake pedal 11. When the brake pedal 11 is fully returned to the initial position by the return spring not shown in the drawing, the control unit 6 opens the solenoid valves 24a and 24b. As a result, the brake fluid in the wheel cylinders 2b and 3b is allowed to return to the reservoir tank 16 via the motor actuated cylinder 13 and the braking force is eliminated. As the detected value of the stroke sensor 11a returns to the initial value, the first piston 21a is caused to return to the initial position, and this in turn causes the second piston 21b to return to the initial position owing to the force transmitted via the connecting member 20.

The brake fluid pressure generated from the motor actuated cylinder 13 is supplied to the wheel cylinder 2b, 3b of each wheel via the VSA system 26 to produce the braking force that is required for the normal brake control. When commanded to distribute the braking force in a proportionate manner to each wheel, the VSA system 26 adjusts the braking force to each wheel in a corresponding manner.

When the regenerative braking is being performed at the same time, the control unit 6 causes the motor/generator 5 to operate as a generator such that an amount of the regenerative braking corresponding to the brake operating amount Ps given by the stroke of the brake pedal 11 is produced. If the vehicle deceleration commanded by the brake operating amount Ps (or by the vehicle operator) cannot be produced by the regenerative braking alone, the electric servo motor 12 actuates the motor actuated cylinder 13, and the coordinated combined braking involving both the regenerative braking and the hydraulic braking is performed. In the example discussed above, the motor actuated drive cylinder 13 was configured to produce a braking force corresponding to the brake operating amount of the brake pedal 11, but it is also possible to determine the operating amount of the motor actuated cylinder 13 according to other per se known methods. For instance, the target brake fluid pressure Bt may be determined by using for an input a braking force command corresponding to a value obtained by subtracting the actual regenerative braking force from the total braking force corresponding to the brake pedal operation amount Ps. Alternatively, the operation amount of the motor actuated cylinder may be selected such that a hydraulic braking force corresponding to a certain ratio to the entire required braking force is produced.

The timing of closing the solenoid valve 24c may be selected as the time point at which the fluid pressure of the second fluid chamber 17b has dropped to an adequately low level to cause the piston 28a to return to the initial position illustrated in FIG. 2 under the biasing force of the compression coil spring 28c. For instance, this timing may be selected as the time point when a prescribed time period has elapsed since the two solenoid valves 24a and 24b are closed. It is also possible to select the timing when the detection value of the brake fluid pressure sensor 25b on the side of the motor actuated cylinder 13 has dropped below a prescribed value such as zero.

<<First Embodiment>>

Figure 3:
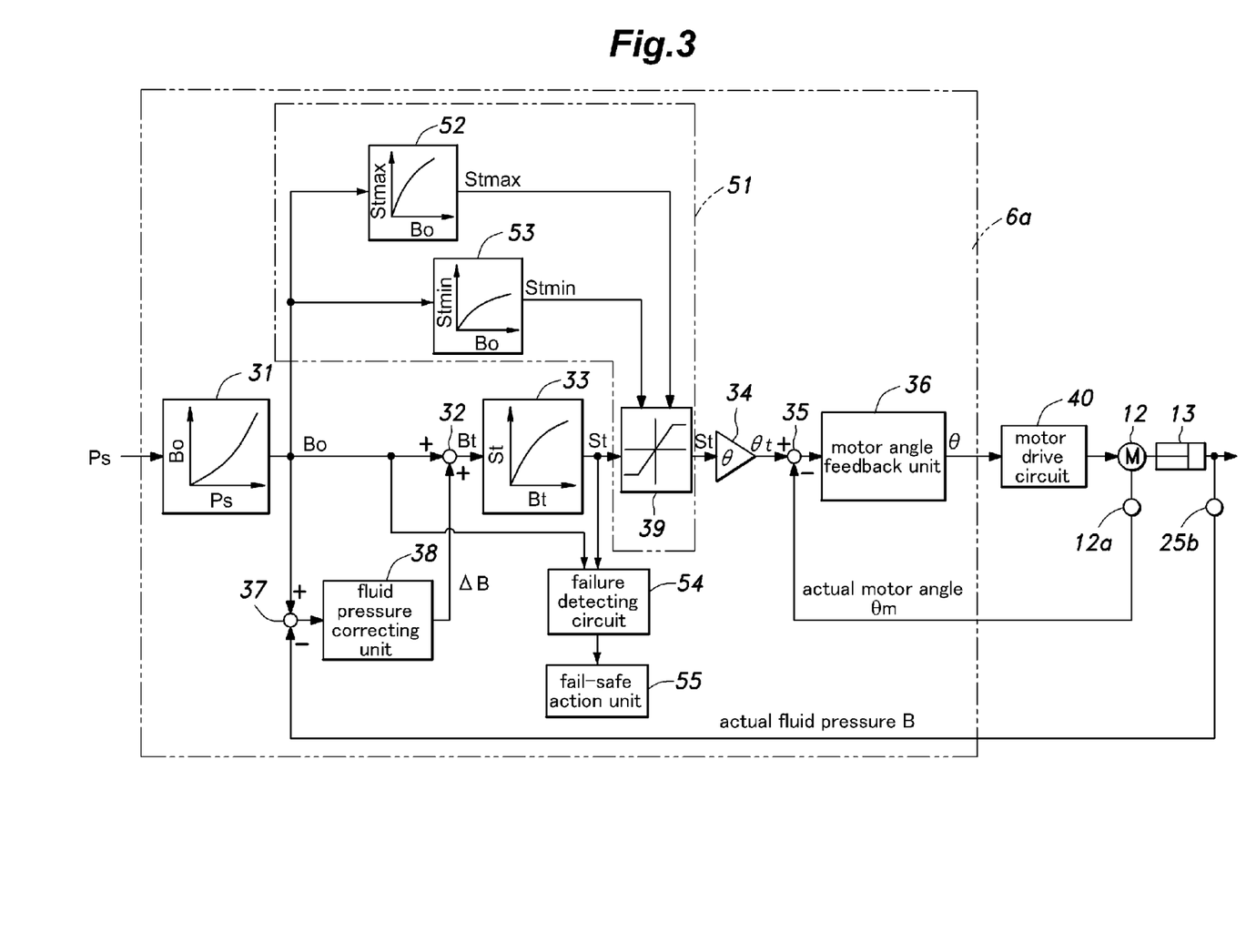
FIG. 3 is a simplified block diagram of the control arrangement for a first embodiment of the present invention.

A fluid pressure adjust control circuit 6a which forms an essential part of the control unit 6 in the first embodiment of the present invention is described in the following with reference to FIG. 3. In addition to the fluid pressure adjust control circuit 6a, the control unit 6 further includes a torque control circuit 6b (not shown in the drawings) in parallel with the fluid pressure adjust control circuit 6a. In the fluid pressure adjust control circuit 6a, the brake input amount (displacement) Ps given by the detection signal of the stroke sensor 11a is forwarded to a braking force reference value setting circuit 31 that provides a reference value B0 to be set as the corrected brake fluid pressure Bt corresponding to the given brake input amount Ps by using a map or a mathematical function. The input of the braking force reference value setting circuit 31 may not necessarily consist of the brake pedal stroke Ps, but may also consist of a detectable input amount (such as the fluid pressure given by the brake fluid pressure sensor 25a and the pressure that is applied to the brake pedal 11).

The reference value B0 obtained by the braking force reference value setting circuit 31 is forwarded to an adder 32. The output of the adder 32 is forwarded to a target value setting circuit 33 as the corrected brake fluid pressure Bt. The target value setting circuit 33 gives a target stroke St corresponding to the corrected brake fluid pressure Bt by using a map, a mathematical function or the like. The target stroke St obtained by the target value setting circuit 33 is forwarded to a motor angle converting unit 34 via a limiter 39 forming a part of a stroke limiting circuit 51 serving as a correction restricting means.

The motor angle converting unit 34 converts the target stroke St into a corresponding target motor angle θt. The target motor angle θt obtained by the motor angle converting unit 34 is forwarded to a subtractor 35, and the output value of the subtractor 35 is forwarded to a motor angle feedback circuit 36. A motor angle control amount θ given by the output of the motor angle feedback circuit 36 is used for controlling the rotational angle of the electric servo motor 12, and hence the stroke of the motor actuated cylinder 13 via a motor drive circuit 40 so that the brake fluid pressure corresponding to a brake control amount Bs is produced.

The motor angle of the electric servo motor 12 is detected by a rotational angle sensor (such as a rotary encoder) 12a serving as an operation amount detecting means, and the actual motor angle θm is forwarded to the subtractor 35 as a feedback value. Therefore, the motor angle feedback circuit 36 receives the output (θt−θm) of the subtractor 35, and determines the motor angle control value θ according to the difference (θt−θm) between the target motor angle θt and the actual motor angle θm. The motor angle control value θ is forwarded to the motor drive circuit 40 so that the electric servo motor 12 is controlled, for instance as a PID control, by the motor drive circuit 40 according to the motor angle control value θ. In this manner, the stroke of the motor actuated cylinder 13 is controlled as a motor angle feedback control of the electric servo motor 12.

The reference value B0 produced from the braking force reference value setting circuit 31 is also forwarded to a subtractor 37 which also receives the detection signal (actual fluid pressure B) from a brake fluid pressure sensor 25b for detecting the brake fluid pressure generated by the motor actuated cylinder 13 as a feedback value. The output of the subtractor 37 is forwarded to a fluid pressure compensation circuit 38, and the output of the fluid pressure compensation circuit 38 or a compensation value ΔB (=B0−B) is forwarded to the other input of the adder 32. The adder 32 which receives the brake fluid pressure reference value B0 as discussed above thus adds the compensation value ΔB to the reference value B0, and forwards the sum (B0+ΔB) to the target value setting circuit 33. In other words, the subtractor 37, the fluid pressure compensation circuit 38 and the adder 32 jointly form a correcting means for correcting the target stroke St by reducing the deviation of the actual brake fluid pressure B from the corrected brake fluid pressure Bt corresponding to the target stroke St. Thereby, the actual fluid pressure B is properly reflected in the target stroke St obtained by the target value setting circuit 33.

The brake fluid pressure reference value B0 produced from the braking force reference value setting circuit 31 is also forwarded to an upper limit setting circuit 52 and a lower limit setting circuit 53 which form a part of the stroke limiting circuit 51. The upper limit setting circuit 52 obtains an upper limit value Stmax of the target stroke St that corresponds to the brake fluid pressure reference value B0 obtained from the braking force reference value setting circuit 31 by using a map, a mathematical function or the like. The lower limit setting circuit 53 obtains a lower limit value Stmin of the target stroke St that corresponds to the brake fluid pressure reference value B0 obtained from the braking force reference value setting circuit 31 by using a map, a mathematical function or the like.

Figure 4:
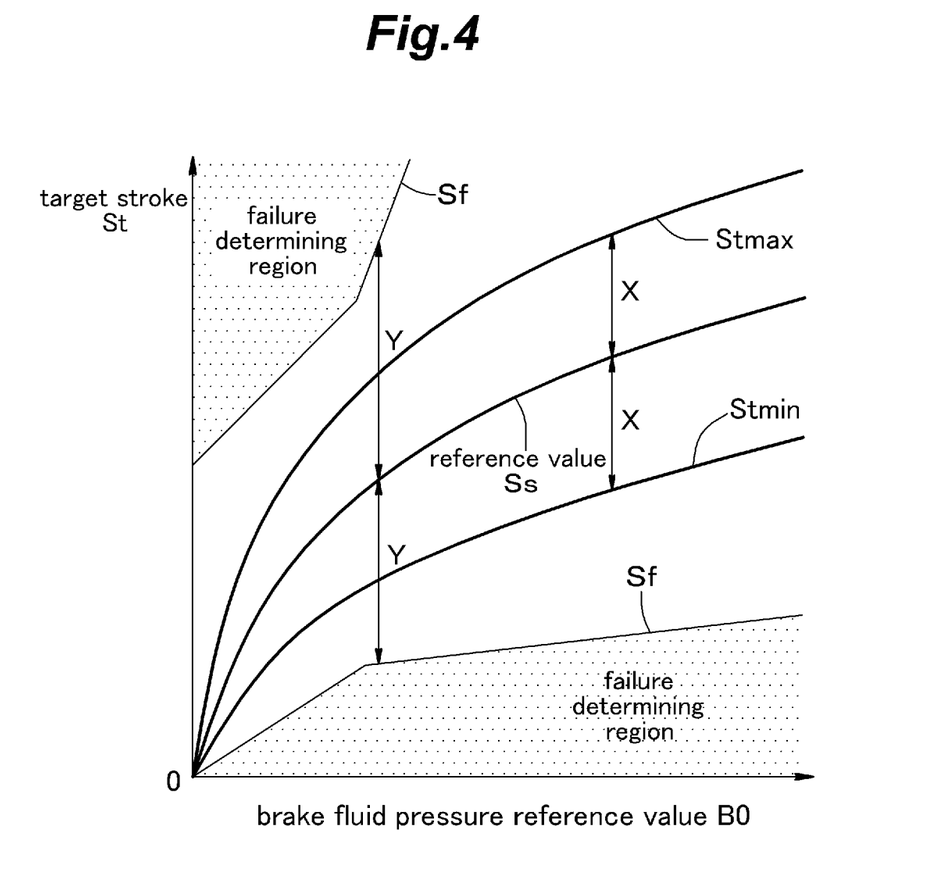
FIG. 4 is a fluid pressure versus motor actuated cylinder stroke map.

As shown in FIG. 4, the upper limit value Stmax and the lower limit value Stmin of the target stroke St are defined with a certain relationship with the stroke reference value Ss of the motor actuated cylinder 13 based on the fluid pressure versus motor actuated cylinder stroke map (load versus fluid pressure loss property) and as a mathematical function of the brake fluid pressure reference value B0 (brake operation amount Ps), in particular so as to increase in value with an increase in the value of the brake fluid pressure reference value B0 and to deviate from the stroke reference value Ss by a value X which is smaller than the deviation of a failure determination value Sf from the stroke reference value Ss for each value of the brake fluid pressure reference value B0 (brake operation amount Ps).

The upper limit value Stmax and the lower limit value Stmin of the target stroke St obtained by the upper limit setting circuit 52 and the lower limit setting circuit 53 are supplied to the limiter 39 which sets the target stroke St forwarded from the target value setting circuit 33 is limited to the upper limit value Stmax and the lower limit value Stmin when the target stroke St is greater than the upper limit value Stmax and lower than the lower limit value Stmin, respectively.

By imposing the upper limit and lower limit on the target stroke St by the limiter 39, an upper and lower limit are imposed on the corrected brake fluid pressure Bt which is given as a sum of the brake fluid pressure reference value B0 corresponding to the brake pedal operation amount Ps and the compensation value ΔB (correction amount) for the fluid pressure compensation. In other words, when the deviation of the corrected brake fluid pressure value Bt corrected by the adder 32 from the brake fluid pressure reference value B0 has exceeded a prescribed value, the correction amount for the corrected brake fluid pressure value B by the fluid pressure compensation circuit 38 and the adder 32 is limited.

As a result, upon occurrence of a change in the load versus fluid loss property that requires a correction exceeding the upper limit value Stmax or the lower limit value Stmin, owing to the restriction action of the stroke limiting circuit 51 imposed on the correction of the target stroke St by the compensation value ΔB, the produced actual brake fluid pressure B will deviate from the reference value corresponding to the brake pedal operation amount Ps or the produced braking force will differ from the braking force that is expected to be produced for the given brake pedal operation amount Ps. As a result, even though a correction of the target stroke St is performed according to the deviation (ΔB) between the brake fluid pressure reference value B0 and the corrected brake fluid pressure value B, the vehicle operator is enabled to perceive the change in the load versus fluid loss property through the change in the feel of the braking force.

Meanwhile, the brake fluid pressure reference value B0 provided by the braking force reference value setting circuit 31 and the target stroke St provided by the target value setting circuit 33 are also forwarded to a failure detection circuit 54.

In the failure detection circuit 54 is set up the failure determination value Sf as a value which deviates from the stroke reference value Ss of the motor actuated drive cylinder 13 by a prescribed amount Y as shown in FIG. 4 so that a failure in the brake system 1 can be detected upon occurrence of an event where the brake pedal target stroke St provided by the target value setting circuit 33 has exceeded this failure determination value Sf (in a failure detection region). Upon detection of a failure, the failure detection circuit 54 produces a failure signal to be forwarded to a fail-safe action circuit 55. Upon receiving the failure signal, the fail-safe action circuit 55 shuts off the output of the motor angle feedback circuit 36 to stop the operation of the motor actuated cylinder 13, and produces signals for opening the solenoid valves 24a and 24b and closing the solenoid valve 24c to perform a fail-safe action by actuating the wheel cylinders 2b and 3b by using the brake fluid pressure created by the master cylinder 15 shown in FIG. 2.

Thus, by evaluating the change in the load versus fluid loss property according to the brake fluid pressure reference value B0 or the brake pedal operation amount Ps provided by the braking force reference value setting circuit 31 and the target stroke St provided by the target value setting circuit 33, determining an occurrence of a failure when a significant change is detected in the load versus fluid loss property, and stopping the brake-by-wire control using the motor actuated drive cylinder 13 in favor of a conventional braking force control using the master cylinder 15, an undesired situation such as exasperating the leakage of brake fluid in case a crack is produced in the brake fluid piping by excessively driving the motor drive cylinder 13 can be avoided.

<Modified Embodiment>

Figure 5:
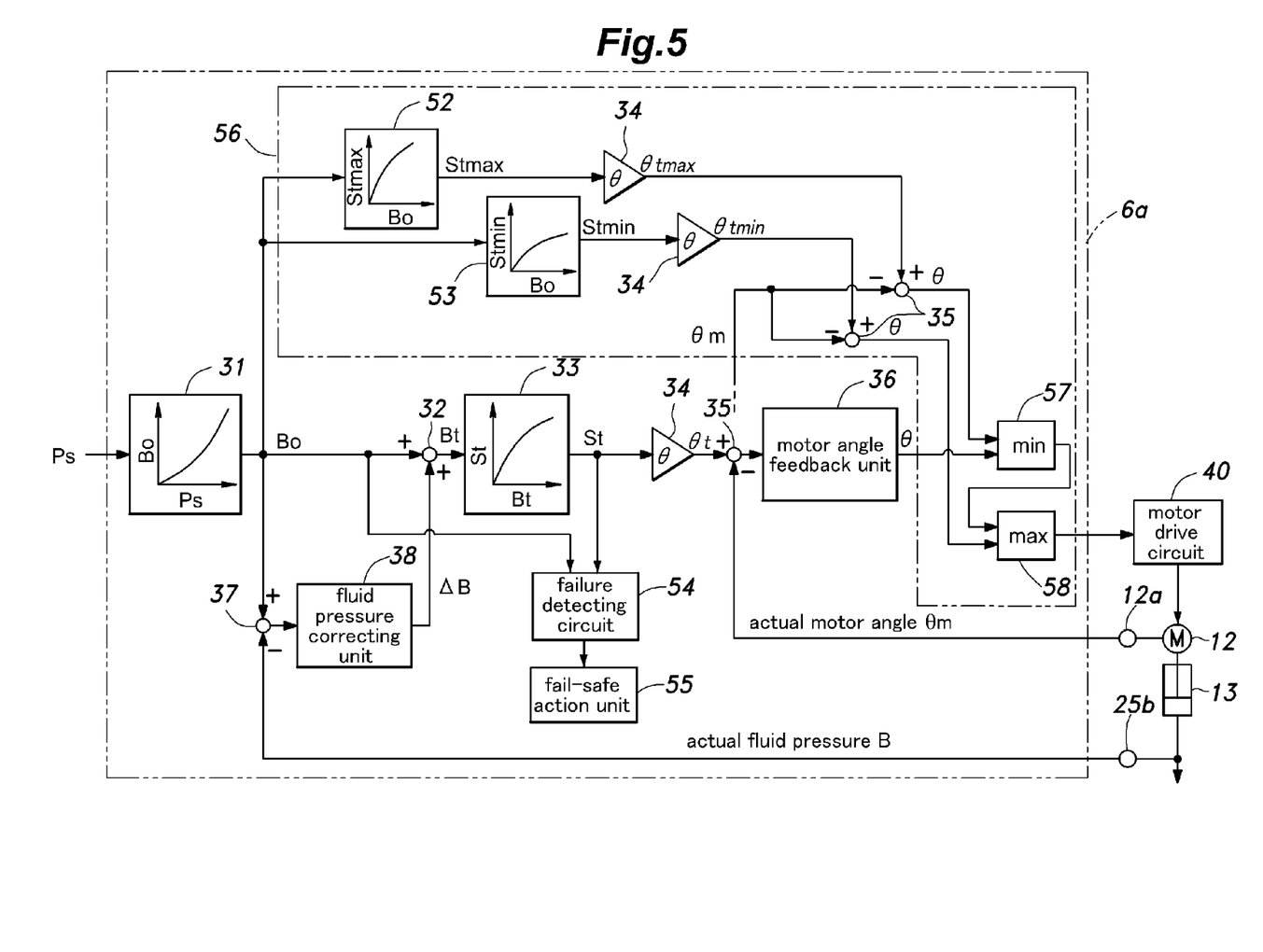
FIG. 5 is a simplified block diagram of the control arrangement for a modification of the first embodiment of the present invention.

A fluid pressure adjust control circuit 6a according to a modification of the first embodiment is described in the following with reference to FIG. 5. The parts of the modified embodiment corresponding to those of the first embodiment are denoted with like numerals without repeating the description of some of such parts. The same is true with the second embodiment which will be described hereinafter.

The fluid pressure adjust control circuit 6a of the modified embodiment includes a limiter control circuit 56 that limits the output of the motor angle feedback circuit 36 to restrict the correction amount of the target stroke St (corrected brake fluid pressure Bt) provided by the subtractor 37, the fluid pressure compensation circuit 38 and the adder 32, instead of the stroke limiting circuit 51. The upper limit value Stmax of the target stroke St is forwarded to a motor angle converting unit 34 which converts the upper limit value Stmax of the target stroke St into a corresponding upper limit value $\theta$tmax of the target motor angle $\theta$t of the electric servo motor 12. This output is used by the limiter control circuit 56. Similarly, the lower limit value Stmin of the target stroke St is forwarded to another motor angle converting unit 34 which converts the lower limit value Stmin of the target stroke St into a corresponding lower limit value $\theta$tmin of the target motor angle $\theta$t of the electric servo motor 12. This output is also used by the limiter control circuit 56.

The upper limit value $\theta$tmax and the lower limit value $\theta$tmin of the target stroke St converted by the motor angle converting units 34, respectively, are forwarded to respective subtractors 35, and the actual motor angle $\theta$m detected by the rotational angle sensor 12a is also forwarded to the subtractors 35. The subtractor 35 to which the upper limit value $\theta$tmax of the target motor angle $\theta$t is supplied produces a motor angle control amount $\theta$ by subtracting the actual motor angle $\theta$m from the upper limit value $\theta$tmax, and then forwards the produced motor angle control amount $\theta$ to a lower value selecting unit 57 which also receives the motor angle control amount $\theta$ forwarded from the motor angle feedback unit 36. The lower value selecting unit 57 selects the lower value of these two motor angle control amounts $\theta$, and the selected motor angle control amounts $\theta$ is forwarded to a higher value selecting unit 58.

Meanwhile, the subtractor 35 to which the lower limit value $\theta$tmin of the target motor angle $\theta$t is supplied produces a motor angle control amount $\theta$ by subtracting the actual motor angle 8m from the lower limit value $\theta$tmin, and then forwards the produced motor angle control amount $\theta$ to the higher value selecting unit 58. The higher value selecting unit 58 selects the lower value of these two motor angle control amounts $\theta$ forwarded thereto, and the selected motor angle control amount $\theta$ is used for controlling the rotational angle of the electric servo motor 12.

In this fluid pressure adjust control circuit 6a, upon occurrence of a change in the load versus fluid loss property which would require a correction amount exceeding the upper limit value Stmax or the lower limit value Stmin of the target stroke St, the limiter control circuit 56 restricts the compensation value $\Delta$B. As a result, the produced actual brake fluid pressure B is shifted from the brake fluid pressure reference value B0 corresponding to the brake pedal operation amount, and the resulting change in the braking force for a given brake pedal force allows the vehicle operator to perceive the change in the load versus fluid loss property. In this embodiment, the stroke was obtained before it is converted into a rotational angle, but it is also possible to directly use the motor angle control amount $\theta$ as the target operation amount.

<<Second Embodiment>>

Figure 6:
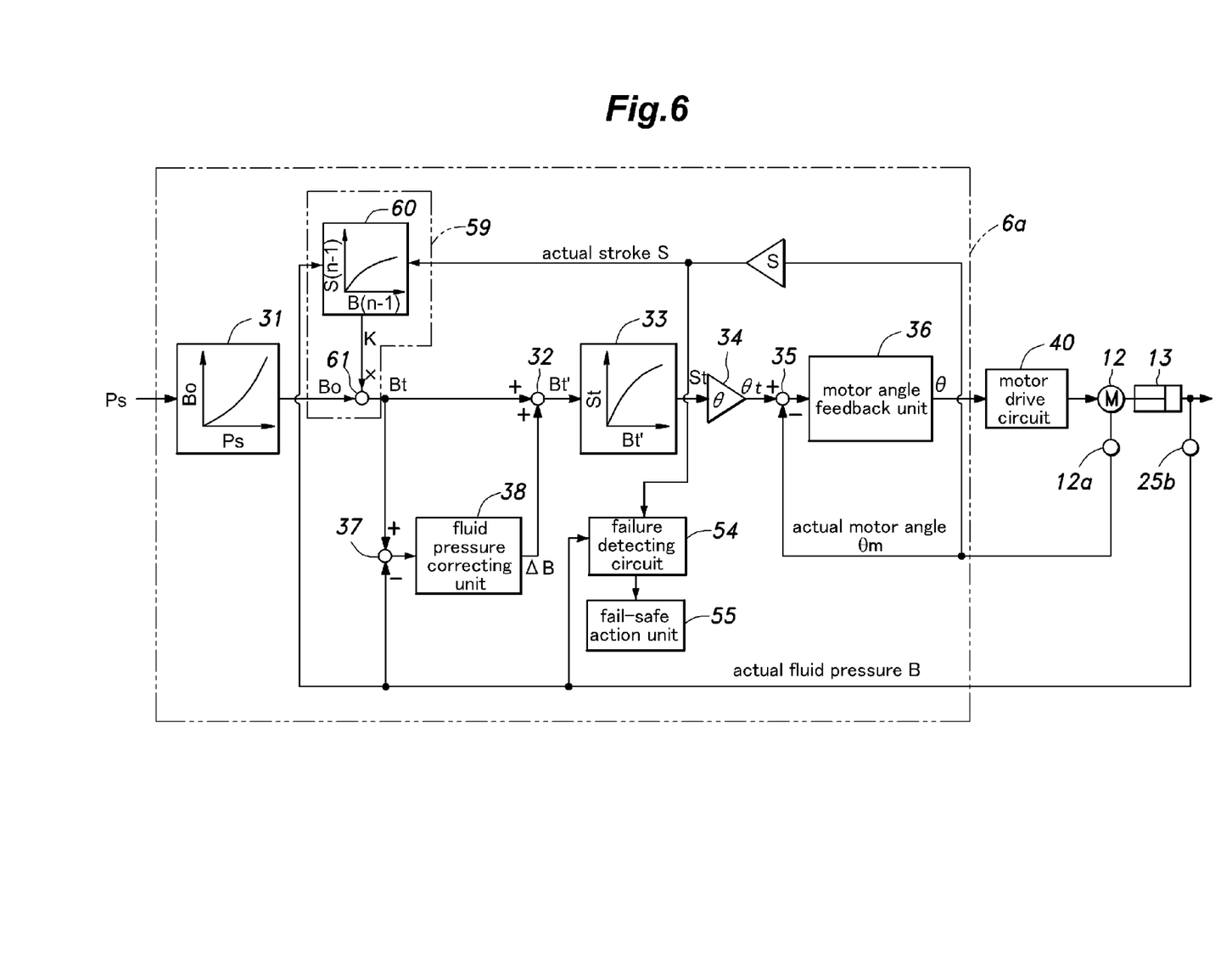
FIG. 6 is a simplified block diagram of the control arrangement for a second embodiment of the present invention.

A fluid pressure adjust control circuit 6a given as a second embodiment of the present invention is described in the following with reference to FIG. 6.

In this fluid pressure adjust control circuit 6a, to restrict the compensation amount of the target stroke St (corrected brake fluid pressure Bt) produced by the subtractor 37, the fluid pressure compensation circuit 38 and the adder 32, a correction amount limiting circuit 59 for determining the correction amount for the target stroke St (corrected brake fluid pressure Bt) is provided, instead of the stroke limiting circuit 51 of the first embodiment or the limiter control circuit 56 of the modified embodiment.

Figure 7:
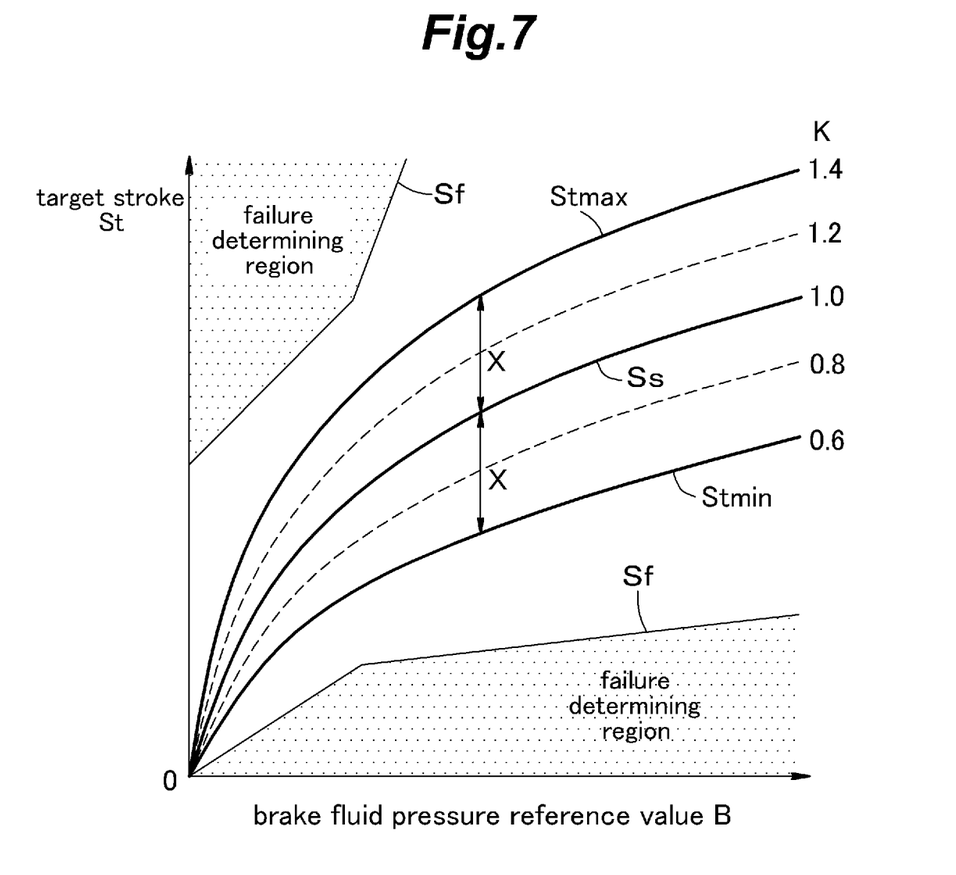
FIG. 7 is a graph for setting a correction factor.

A correction factor setting circuit 60 forming a part of the correction amount limiting circuit 59 determines a correction factor K for the target stroke St (corrected brake fluid pressure Bt) according to the previous values B(n−1) and S(n−1) of the actual brake fluid pressure by using a map given in FIG. 7.

The map shown in FIG. 7 which is referred to by the correction factor setting circuit 60 defines a region (stroke reference value Ss) where the correction factor K is given as 1 and the region where the correction factor K is determined in dependence on the deviation (St−Ss) of each given actual stroke S from the stroke reference value Ss according to the ideal relationship (load versus stiffness property) between the fluid pressure and the stroke which is demonstrated when the motor actuated cylinder 13 is driven. More specifically, when the actual stroke S is greater than the stroke reference value Ss for a given actual brake fluid pressure B or when the change that has occurred increased the fluid pressure loss, a correction factor K greater than 1 is produced from the correction factor setting circuit 60. Conversely, when the actual stroke S is smaller than the stroke reference value Ss for a given actual brake fluid pressure B or when the change that has occurred decreased the fluid pressure loss, a correction factor K smaller than 1 is produced from the correction factor setting circuit 60.

Similarly as in the first embodiment, the map of FIG. 7 defines an upper limit value Stmax and a lower limit value Stmin of the target stroke St each as a value where the deviation of the actual stroke S from the stroke reference value Ss is equal to a prescribed amount X. Therefore, if the received actual stroke S exceeds either the upper limit value Stmax or the lower limit value Stmin, the correction factor K (1.4 or 0.6) designated for the corresponding one of the upper limit value Stmax and the lower limit value Stmin is produced.

The correction factor K produced from the correction factor setting circuit 60 is forwarded to a multiplier 61 which also receives a brake fluid pressure reference value B0 corresponding to the brake pedal operation amount Ps forwarded from the fluid pressure reference value setting circuit 31. Therefore, when the change is in the direction to increase the load versus fluid loss, the corrected brake fluid pressure Bt is set greater than the brake fluid pressure reference value B0. Conversely, when the change is in the direction to decrease the load versus fluid loss, the corrected brake fluid pressure Bt is set smaller than the brake fluid pressure reference value B0. Therefore, when the actual stroke S and the actual brake fluid pressure B are within the region defined between the lines of the upper limit value Stmax and the lower limit value Stmin of the target stroke St in the map shown in FIG. 7, the target stroke St is appropriately corrected such that the actual brake fluid pressure B follows the brake fluid pressure reference value B0 with an appropriate adjustment being made thereto. When the actual stroke S and the actual brake fluid pressure B are outside the region defined between the lines of the upper limit value Stmax and the lower limit value Stmin of the target stroke St, the corrected brake fluid pressure Bt is limited by the correction factor K which corresponds to the upper limit value Stmax or the lower limit value Stmin, as the case may be. In other words, the correction amount is restricted (to $(K-1) \times B0$) by the correction amount limiting circuit 59.

Owing to the structure of the fluid pressure adjust control circuit 6a discussed above, in addition to the effect achieved by the first embodiment, the second embodiment is able to restrict the correction amount in proportion to the severity in the change in the load versus fluid loss property so that the level of restriction can be changed in a progressively manner with the increase in the change in the load versus fluid loss property. As a result, the impression or feel in the change of the braking force for each given pedal force can be maintained in a favorable manner so that the vehicle operator is enabled to perceive the change in the feel of the braking force without suffering from the problem of creating an unfamiliar impression. Therefore, the vehicle operator can perceive the change in the load versus fluid loss property in a similar manner as in a conventional vehicle, and is prevented from experiencing any discomfort.

This concludes the description of the embodiments of the present invention, but it should be noted that the present invention is not limited by such embodiments, and the specific configuration and layout of each component, as well as the contents of the process carried out by each component, can be modified without departing from the spirit of the present invention.

For instance, the stroke limiting circuit 51 or the limiter control circuit 56 defined the upper limit value Stmax and the lower limit value Stmin of the target stroke St as values that deviate from the stroke reference value Ss by the prescribed amount X as shown by the map given in FIG. 4 in the first embodiment and the modified embodiment, respectively, and the correction amount restricting circuit 59 defined the correction factor K at the upper and lower limits of the target stroke St according to the upper limit value Stmax and the lower limit value Stmin of the target stroke St defined as values that deviate from the stroke reference value Ss by the prescribed amount X as shown by the map given in FIG. 7. However, the prescribed amount X on the side of the upper limit value Stmax may differ from the prescribed amount on the side of the lower limit value Stmin. In such a case, it is preferable to make the prescribed amount X on the side of the upper limit value Stmax to be greater than the prescribed amount X on the side of the lower limit value Stmin so that when the fluid pressure compensated target stroke St (first embodiment) or the actual stroke S (second embodiment) has exceeded the upper limit value Stmax, the vehicle operator may be enabled to perceive the change in the braking force by reducing the braking force and may be allowed to produce a braking force which is closer to that intended by the vehicle operator by limiting the target stroke St to the upper limit value Stmax.

When the braking force is to be controlled by devices such as a VSA control device or an ABS device other than the motor actuated cylinder 13 (consisting of the VSA device in the foregoing embodiments), the control unit 6 retains the correction amount restricted by the stroke limiting circuit 51 (first embodiment), the limiter control circuit 56 (modified embodiment) or the correction amount restricting circuit 59 (second embodiment), and the VSA or ABS may perform the VSA or ABS control by taking into account the retained correction amount. Thereby, the interferences between the braking force that is varied by the VSA or ABS control and the braking force that is generated by the motor actuated cylinder 13 can be avoided. Furthermore, the precision of the VSA or ABS control may be improved.

The brake system according to the present invention described in terms of the embodiments thereof does not necessarily require all of the components disclosed above, and may be implemented while omitting some of the components without departing from the spirit of the present invention.

Glossary
1 brake system
2 front wheel
2a disk (friction braking means)
2b wheel cylinder (friction braking means)
3 rear wheel
3a disk (friction braking means)
3b wheel cylinder (friction braking means)
11 brake pedal
11a stroke sensor (brake pedal operation amount detecting means)
13 motor actuated cylinder (fluid pressure generating means)
15 master cylinder
25b brake fluid pressure sensor (actual brake fluid pressure detecting means)
31 braking force reference value setting circuit (target operation amount setting means)
32 adder (correcting means)
33 target value setting circuit (target operation amount setting means)
37 subtractor (correcting means)
38 fluid pressure compensation circuit (correcting means)
51 stroke limiting circuit (correction restricting means)
55 fail-safe action circuit
56 limiter control circuit (correction restricting means)
59 correction amount limiting circuit (correction restricting means)
B actual brake fluid pressure
B0 brake fluid pressure reference value
Bt target brake fluid pressure
K correction factor
Ps brake pedal operation amount
Ss stroke reference value
St target stroke
S actual stroke
V vehicle
X prescribed amount (first prescribed amount)
Y prescribed amount (second prescribed amount)
ΔB compensation value (deviation)

The invention claimed is:
1. A vehicle brake system, comprising:
a fluid pressure generating unit power actuated according to a given target operation amount to generate a brake fluid pressure corresponding to the operation amount;
a friction braking unit configured to be actuated by the brake fluid pressure generated by the fluid pressure generating unit;
an actual brake fluid pressure detecting unit for detecting an actual brake fluid pressure supplied to the friction braking unit;

a brake pedal operation amount detecting unit for detecting a brake pedal operation amount caused by a vehicle operator;

a target operation amount setting unit for setting the target operation amount according to the detected brake pedal operation amount;

a correcting unit for correcting the target operation amount so as to reduce a deviation of a brake fluid pressure corresponding to the target operation amount from the actual brake fluid pressure;

an actual operation amount detecting unit for detecting an actual operation amount of the fluid pressure generating unit; and a correction restricting unit for restricting an amount by which the target operation amount is corrected by the correcting unit according to the actual operation amount of the fluid pressure generating unit and the actual brake fluid pressure.

2. The vehicle brake system according to claim 1, further comprising a master cylinder configured to be actuated by a brake pedal; and a fail-safe unit for stopping an operation of the fluid pressure generating unit and driving the friction braking unit with a brake fluid pressure produced by the master cylinder when the correction amount of the correcting unit is restricted by the correction restricting unit and the actual brake fluid pressure has exceeded a prescribed abnormality determination value.

* * * * *